United States Patent
Hsu (10) Patent No.: US 8,649,320 B2
(45) Date of Patent: Feb. 11, 2014

(54) METHOD AND RELATED DEVICE OF SCHEDULING REQUEST BEHAVIOR IN A WIRELESS COMMUNICATION SYSTEM

(75) Inventor: Chia-Chun Hsu, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 519 days.

(21) Appl. No.: 12/538,164

(22) Filed: Aug. 10, 2009

(65) Prior Publication Data

US 2010/0074231 A1 Mar. 25, 2010

Related U.S. Application Data

(60) Provisional application No. 61/099,188, filed on Sep. 22, 2008.

(51) Int. Cl.
*H04B 7/212* (2006.01)

(52) U.S. Cl.
USPC ........... 370/322; 370/329; 370/348; 370/437; 370/449; 370/462

(58) Field of Classification Search
USPC ......... 370/322, 329, 348, 433, 437, 449, 461, 370/462
See application file for complete search history.

(56) References Cited

U.S. PATENT DOCUMENTS

| 2007/0135130 A1 | 6/2007 | Lee |
| 2008/0101306 A1 | 5/2008 | Bertrand |
| 2008/0117891 A1* | 5/2008 | Damnjanovic et al. ....... 370/345 |
| 2009/0270108 A1* | 10/2009 | Xu .............................. 455/452.2 |
| 2010/0040028 A1* | 2/2010 | Maheshwari et al. ........ 370/336 |
| 2010/0202420 A1* | 8/2010 | Jersenius et al. ............. 370/337 |

FOREIGN PATENT DOCUMENTS

EP 2 079 270 A1 7/2009

OTHER PUBLICATIONS

Ericsson: "SR triggering in relation to uplink grants", 3GPP TSG-RAN WG2 #61bis, R2-081468, Mar. 31-Apr. 4, 2008, p. 1/3 to p. 3/3, XP050139212, Shenzhen, China.
HTC Corporation: "Pending SR with SPS", 3GPP TSG-RAN WG2 #63bis, R2-085887, Sep. 29-Oct. 3, 2008, XP050320608, Prague, Czech.
3GPP TS 36.321 v8.3.0 MAC specification, Sep. 2008.
3GPP TSG-RAN2#63bis R2-084464, Aug. 2008.
Ericsson et al., "Framework for Scheduling Request and Buffer Status Reporting", TSG-RAN WG2 Meeting #60, Tdoc R2-074691, Jeju, Korea, Nov. 5-9, 2007.
Office action mailed on Jul. 31, 2013 for the China application No. 201110343383.9, filed Sep. 22, 2009, p. 1-6.
3GPP TS 36.321 V8.2.0 http://www.3gpp.org/ftp/Specs/archive/36_series/36.321/36321-820.zip. (May 2008), coverpage, p. 18 and 21.
Office action mailed on Mar. 18, 2013 for the Taiwan application No. 098130672, filed Sep. 11, 2009, p. 1-5.

* cited by examiner

*Primary Examiner* — Alvin Zhu
(74) *Attorney, Agent, or Firm* — Winston Hsu; Scott Margo (57) ABSTRACT

A method of scheduling request (SR) behavior for a UE configured with semi-persistent scheduling in a wireless communication system includes triggering an SR when the UE does not have an uplink resource allocated for a current transmission time interval, and controlling the triggered SR to remain pending and to be repeated until uplink resources are granted for a new transmission.

20 Claims, 10 Drawing Sheets

| Means of grants | Dynamic Scheduling | | SPS | |
|---|---|---|---|---|
| | PDCCH | | PDCCH | RRC reservation |
| Types of transmission | New | Retransmission | Activation/ modification | Retransmission | Periodic resources |
| SR behavior | Cancelled | Repeated | Unspecified | Repeated | Unspecified |

METHOD AND RELATED DEVICE OF SCHEDULING REQUEST BEHAVIOR IN A WIRELESS COMMUNICATION SYSTEM

CROSS REFERENCE TO RELATED APPLICATIONS

This application claims the benefit of U.S. Provisional Application No. 61/099,188, filed on Sep. 22, 2008 and entitled "METHOD AND RELATED DEVICE FOR IMPROVING SCHEDULING REQUEST BEHAVIOR IN WIRELESS COMMUNICATIONS SYSTEM", the contents of which are incorporated herein.

BACKGROUND OF THE INVENTION

1. Field of the Invention

The present invention relates to a method and related communication device of scheduling request behavior in a wireless communication system, and more particularly, to a method and related communication device of criteria of scheduling request cancellation.

2. Description of the Prior Art

A long-term evolution (LTE) system, initiated by the third generation partnership project (3GPP), is now being regarded as a new radio interface and radio network architecture that provides a high data rate, low latency, packet optimization, and improved system capacity and coverage. In the LTE system, an evolved universal terrestrial radio access network (E-UTRAN) includes a plurality of evolved Node-Bs (eNBs) and communicates with a plurality of mobile stations, also referred as user equipments (UEs). The radio protocol stacks of E-UTRAN is given including a radio resource control layer (RRC), a packet data convergence protocol layer (PDCP), a radio link control layer (RLC), a media access control layer (MAC), and a physical layer (PHY).

In order to utilize shared channel (SCH) resources, a dynamic scheduling (DS) function is used in the MAC. When sharing resources between UEs, MAC in an eNB dynamically assigns downlink shared channel (DL-SCH) or uplink shared channel (UL-SCH) resources by physical downlink control channel (PDCCH) signaling including cell radio network temporary identifier (C-RNTI) to allocate physical layer resources depending on traffic volume, quality of service (QoS) requirements of each UE, and associated radio bearers. Furthermore, in order to optimize data transmission, a semi-persistent scheduling (SPS) is introduced afterward and is also used in the MAC for serving upper layer applications, which generates semi-static size data periodically, e.g. VOIP services, more efficiently than DS. The eNB activates/modifies SPS resources by sending a PDCCH signalling including SPS C-RNTI that is a specific UE identity assigned by the RRC.

According to the current MAC specification, a scheduling request (SR) is used by a UE for requesting UL resources. The SR is triggered when the UE does not have any UL resource allocated for the current transmission time interval (TTI), which implies that a dedicated SR (D-SR, also abbreviated to SR) is transmitted on a resource, e.g. a physical uplink control channel (PUCCH). For DS, if a PUCCH is configured for the UE to send an SR in the current TTI, the MAC instructs PHY to signal the SR on the PUCCH. Otherwise, if no PUCCH for an SR is configured for the UE in any TTI, the MAC performs a random access procedure in which the MAC instructs the PHY to transmit a Random Access Preamble using a selected physical random access channel (PRACH) resource. After the Random Access Preamble is transmitted successfully, the eNB sends a Random Access Response corresponding to the Random Access Preamble to the UE. Besides, a triggered SR is considered pending and is repeated until resources for new transmission are available. Note that the above are mainly illustrates SR behavior in DS. Up to now, there is no further consideration for SR behavior when SPS is introduced.

For DS, the eNB assigns UL resources for a new transmission or a retransmission by PDCCH signaling. How the UE recognizes a new transmission or a retransmission is through a hybrid automatic repeat request (HARQ) process identification (ID) and a new data indicator (NDI). For the same HARQ process ID (implicit for UL grant), the toggled NDI indicates a new transmission or a retransmission. When SPS is introduced, it is specified that the eNB activates/modifies SPS resources by a PDCCH signaling, and the periodic SPS resources after the activation are allocated without PDCCH assignment. SPS modification is that eNB modifies the periodicity of SPS to a bigger or smaller value when UL resource demand for the UE configured with SPS decreases or increases. SPS retransmission is also assigned by PDCCH signaling. Note that the use of NDI in SPS is different from that in DS. One or more specific HARQ process ID(s) is assigned/associated with SPS, and NDI is always set to 0 for activation/modification and 1 for retransmission. The UE can identify the used type of transmission and scheduling through C-RNTI, SPS C-RNTI (or the specific SPS HARQ process ID), and NDI.

Figure 1:
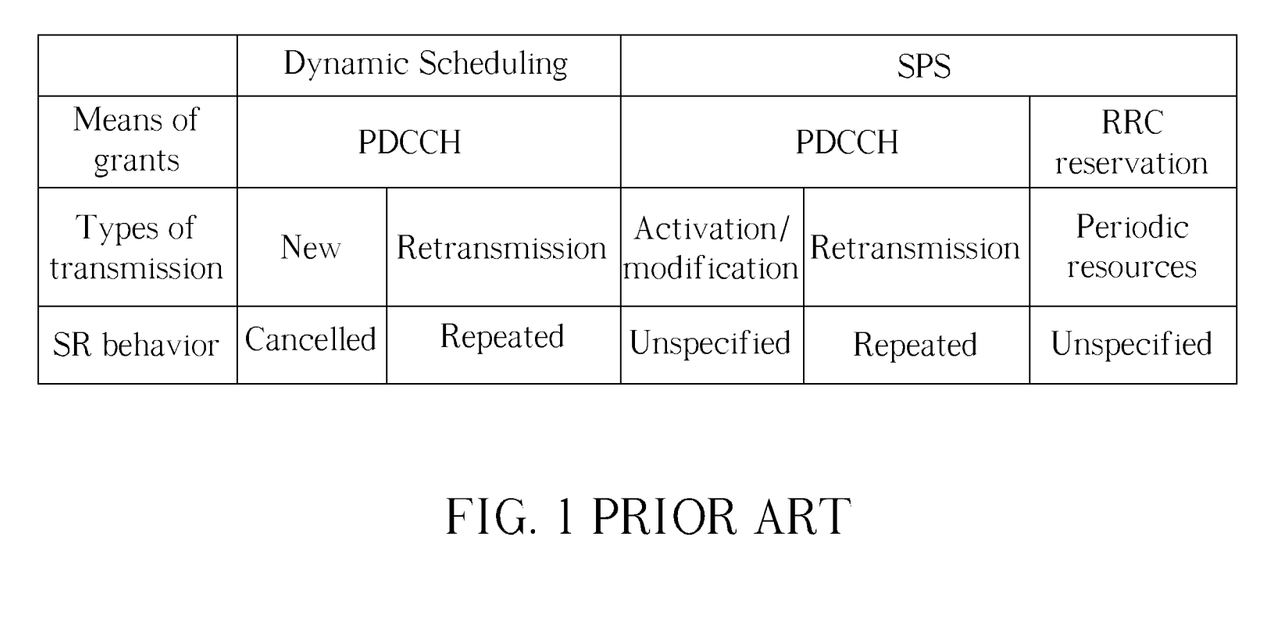
FIG. 1 is a comparison table of SR behavior of DS and SPS according to the prior art.

Please refer to FIG. 1, which is a comparison table of SR behavior of DS and SPS according to the prior art. For DS, a pending SR is repeated until UL-SCH resources are granted for a new transmission, i.e., a pending SR is cancelled by the allocated UL resource for a new transmission. Compared with the definite SR behavior in DS, SR behavior when SPS is introduced is kind of indistinct. As to SPS retransmission, it is obvious that a pending SR should be repeated since the allocated UL grant is not for new data. Even though NDI concept for SPS is different from that for DS, there is little doubt that the UE has to continue SR after an UL-SCH resource is granted for an SPS retransmission. As to two cases of new SPS transmission, SPS activation/modification and periodic SPS resources, as shown in FIG. 1, it is ambiguous that whether SPS UL resources with PDCCH assignment, e.g. SPS activation/modification, should terminate SR, and whether UL-SCH resources without PDCCH assignment, e.g. periodic SPS UL resources, should terminate SR.

For SPS activation/modification, new UL-SCH resources are assigned by PDCCH and concerns mainly about SPS data. For periodic SPS resources that are not assigned by PDCCH every time, they are also mainly allocated for SPS data transmission. SPS data has a higher priority to be transmitted with UL resources. Up to now, it is not clear whether an SR is triggered by excess SPS data or by non-SPS data when non-SPS data arrives in a transmission buffer in which SPS data already exists. If an SR is triggered by non-SPS data but the triggered SR is cancelled by periodic SPS resources or by an UL resource for SPS activation/modification before any PUCCH resource is available, non-SPS data may sit in the transmission buffer for a long time. Please refer to FIG. 2, which is a timing diagram illustrating a worst case that SPS resources periodically cancel SRs according to the prior art. The cancellation could happen periodically and results in short-lived SRs which never reach the coming PUCCH resources. Consequently, eNB is never informed about the buffered non-SPS data, and the non-SPS data always sits in the transmission buffer.

Figure 3:
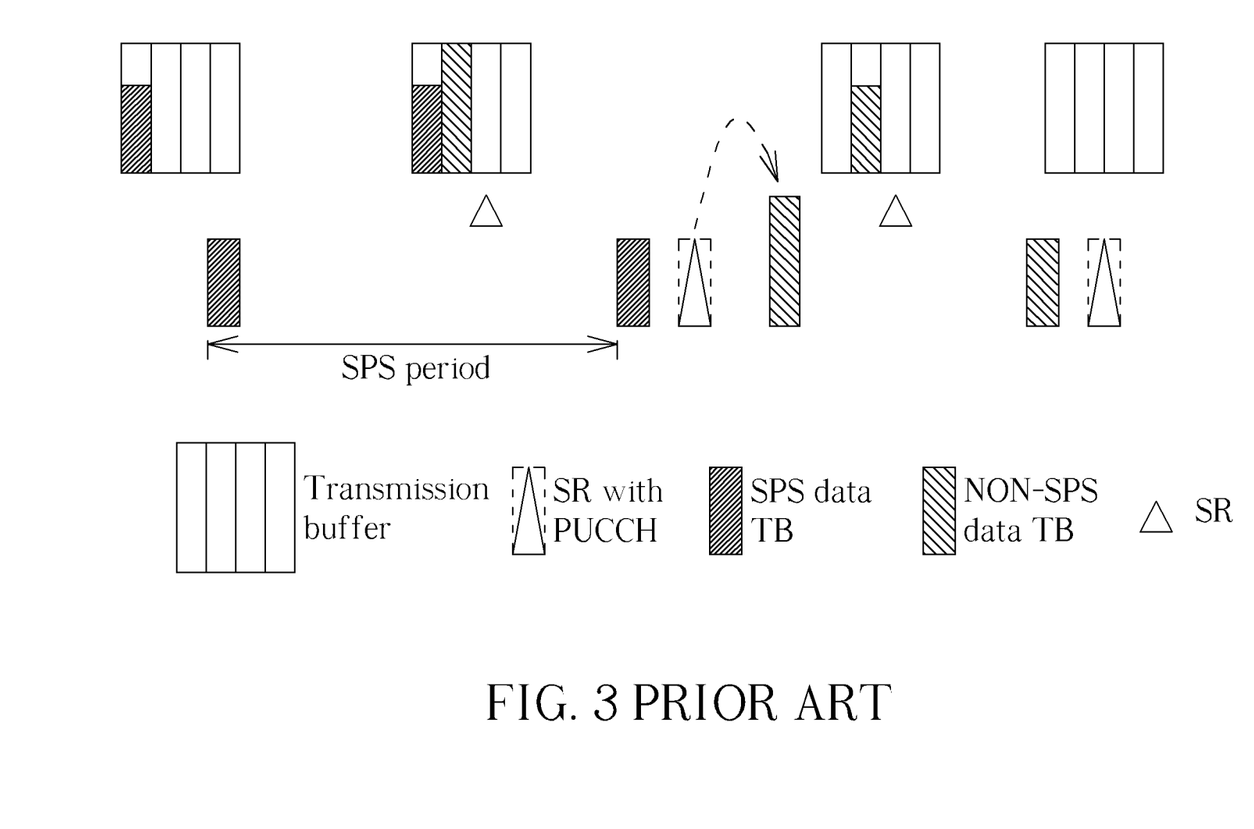
FIG. 3 is a timing diagram illustrating that an SR is still pending when the transmission buffer is already emptied according to the prior art.

In addition, the eNB has the right to ignore SR(s) from any UE if it deems proper, and the eNB can also terminate the SR by assigning an UL resource through dynamic scheduling. Please refer to FIG. 3, which is a timing diagram illustrating that an SR is still pending when the transmission buffer is already emptied according to the prior art. As shown in FIG. 3, an SR triggered by non-SPS data is supposed to be cancelled by SPS resources and is transmitted with an available PUCCH resource, so that the non-SPS data is transmitted latter with an allocated UL grant. And, the next non-SPS data also triggers an SR and is transmitted by an unused SPS resource, which leaves the transmission buffer empty. In this situation, the triggered SR is still pending. In the current specification, it is not clear that what the eNB or the UE should do with respect to a pending SR after the transmission buffer is emptied; however, it is no meaning for the UE continuing the pending SR after the transmission buffer is emptied.

SUMMARY OF THE INVENTION

The present invention therefore provides a method of scheduling request (SR) and related communication device.

The present invention discloses a method of SR behavior for a MAC layer of a UE in a wireless communication system. The method includes triggering an SR when the UE does not have any uplink resource allocated for a current transmission time interval, and when semi-persistent scheduling is configured, controlling the triggered SR to remain pending and to be repeated until uplink resources are granted for a new transmission.

The present invention further discloses a communication device of a wireless communication system for SR behavior. The communication device includes a computer readable recording medium for storing program code corresponding to a process, and a processor coupled to the computer readable recording medium for processing the program code to execute the process. The process includes triggering an SR when the UE does not have any uplink resource allocated for a current transmission time interval, and when semi-persistent scheduling is configured, controlling the triggered SR to remain pending and to be repeated until uplink resources are granted for a new transmission.

The present invention further discloses a communication device of a wireless communication system for SR behavior. The communication device includes a trigger unit for triggering an SR when the communication device does not have any uplink resource allocated for a current transmission time interval, and an SR control unit coupled to the trigger unit for controlling the triggered SR to remain pending and to be repeated until uplink resources are granted for a new transmission when semi-persistent scheduling is configured.

The present invention further discloses a method of SR behavior for a UE in a wireless communication system. The method includes monitoring a transmission buffer and stopping sending an SR when the transmission buffer is emptied.

The present invention further discloses a communication device of a wireless communication system for SR behavior. The communication device includes a computer readable recording medium for storing storage data comprising program code corresponding to a process, and a processor coupled to the computer readable recording medium for processing the program code to execute the process. The process includes monitoring a transmission buffer and stopping sending an SR when the transmission buffer is emptied.

The present invention further discloses a communication device of a wireless communication system for SR behavior. The communication device includes a monitoring unit for monitoring a transmission buffer, and an SR control unit coupled to the monitoring unit for controlling the communication device to stop sending an SR when the monitoring unit observes that the transmission buffer is emptied.

These and other objectives of the present invention will no doubt become obvious to those of ordinary skill in the art after reading the following detailed description of the preferred embodiment that is illustrated in the various figures and drawings.

DETAILED DESCRIPTION

Figure 4:
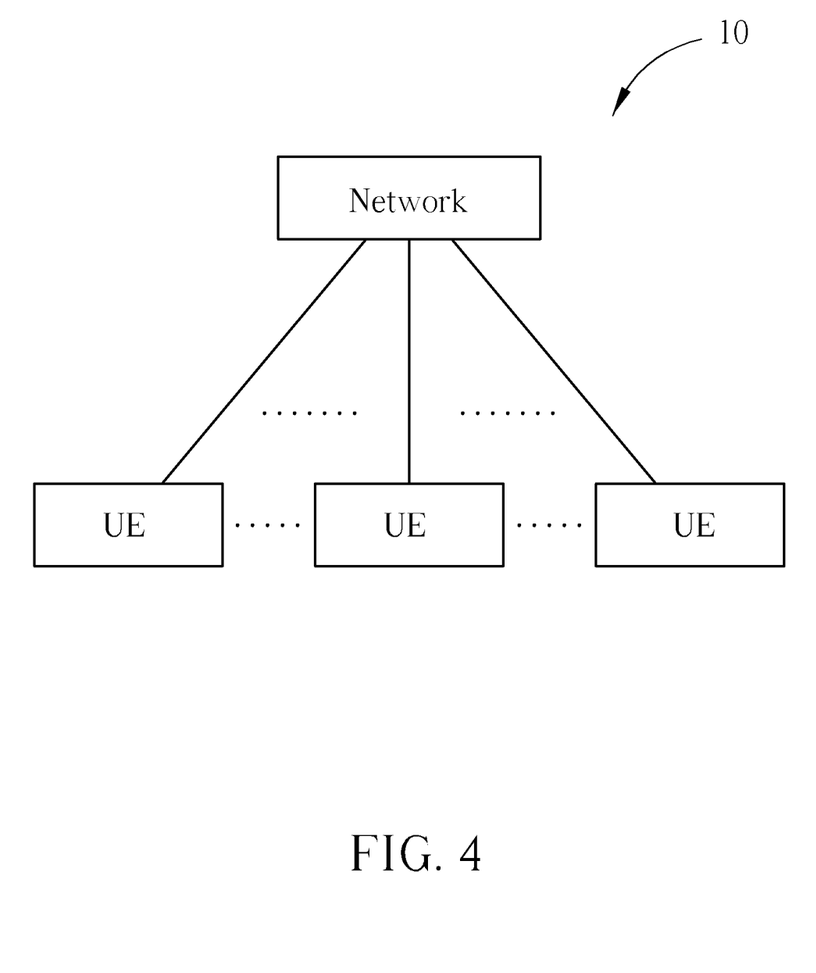
FIG. 4 is a schematic diagram of a wireless communication system.

Please refer to FIG. 4, which is a schematic diagram of a wireless communication system 10 according to an embodiment of the present invention. The wireless communication system 10 is an LTE (long-term evolution) system or other mobile communication systems, and is briefly composed of a network and a plurality of user equipments (UEs). In FIG. 4, the network and the UEs are simply utilized for illustrating the structure of the wireless communication system 10. Practically, the network may be an evolved universal terrestrial radio access network (E-UTRAN) comprising a plurality of evolved base stations (eNBs). The UEs can be devices such as mobile phones, computer systems, etc. Besides, the network and the UE can be seen as a transmitter or receiver according to transmission direction, e.g., for uplink, the UE is the transmitter and the network is the receiver, and for downlink, the network is the transmitter and the UE is the receiver.

Figure 5:
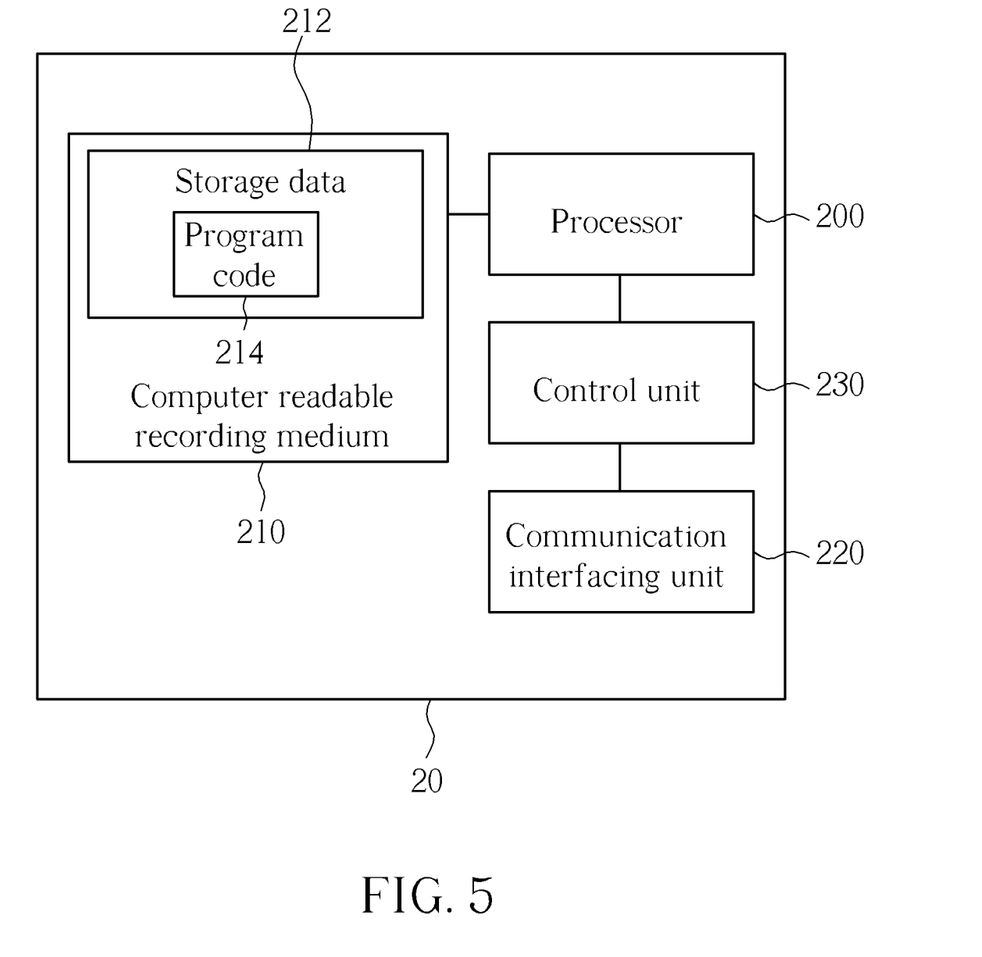
FIG. 5 is a schematic diagram of a communication device according to embodiments of the present invention.

Please refer to FIG. 5, which is a schematic diagram of a communication device 20 according to embodiments of the present invention. The communication device 20 can be the UE shown in FIG. 5 and includes a processor 200, a computer readable recording medium 210, a communication interfacing unit 220 and a control unit 230. The computer readable recording medium 210 is any data storage device that stores storage data 212, including program code 214, thereafter read and processed by the processor 200. Examples of the computer readable recording medium 210 include a subscriber identity module (SIM), read-only memory (ROM), random-access memory (RAM), CD-ROMs, magnetic tapes, floppy disks, optical data storage devices, and carrier waves (such as data transmission through the Internet). The control unit 230 controls the communication interfacing unit 220 and related operations and states of the communication device 20 according to processing results of the process 200. The communication interfacing unit 220 is preferably a radio transceiver for wirelessly communicating with the network.

Figure 6:
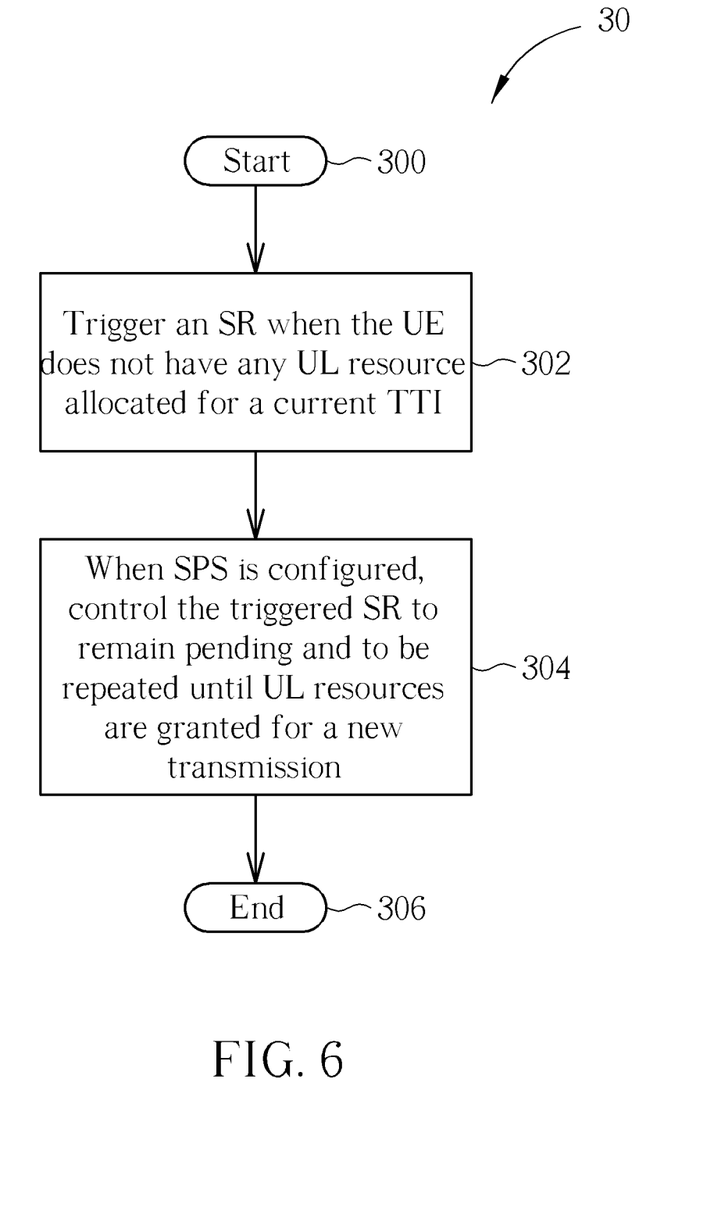
FIG. 6 is a flowchart of a process according to an embodiment of the present invention.

The definition that a pending SR is repeated until UL-SCH resources are granted for a new transmission is considered indistinct after SPS is introduced because a pending SR may be cancelled periodically by SPS resources, in the worst case. Please refer to FIG. 6, which is a flowchart of a process 30 according to an embodiment of the present invention. The process 30 is utilized in a UE, may be a Media Access Control (MAC) layer of the UE, of the wireless communication system 10, for SR behavior. The process 30 can be compiled into the program code 214 and includes the following steps:

Step 300: Start.
Step 302: Trigger an SR when the UE does not have any UL resource allocated for a current transmission time interval (TTI)
Step 304: When SPS is configured, control the triggered SR to remain pending and to be repeated until UL resources are granted for a new transmission.
Step 306: End.

According to the process 30, when the UE does not have any UL resource allocated for the current TTI, the SR is triggered. When SPS is configured, the MAC controls the triggered SR to remain pending and to be repeated until the UL resources are granted for a new transmission. Under SPS, the UL resources for the new transmission can be indifferent types, including UL resources granted by a dynamic scheduling C-RNTI, by an SPS C-RNTI, or UL resources configured by RRC due to SPS. The dynamic scheduling C-RNTI is included in a PDCCH signalling to indicate that the UL resources are allocated for non-SPS data; the SPS C-RNTI is included in a PDCCH signalling to indicate that the UL resources are allocated for SPS activation or modification; and, the UL resources configured by RRC due to SPS are also called periodic SPS resources, which is assigned without PDCCH signalling.

As a result, when SPS is configured, the pending SR is not cancelled by any other UL resources except for the UL resources granted by the dynamic scheduling C-RNTI, so that non-SPS data has opportunity to be transmitted instead of being stalled in the transmission buffer. In addition, if the UE finds no problem of the periodic SR cancellation, the process 30 also provides another possibility for which the pending SR is cancelled by any UL resource granted by the SPS C-RNTI, or cancelled by periodic SPS resources.

Figure 2:
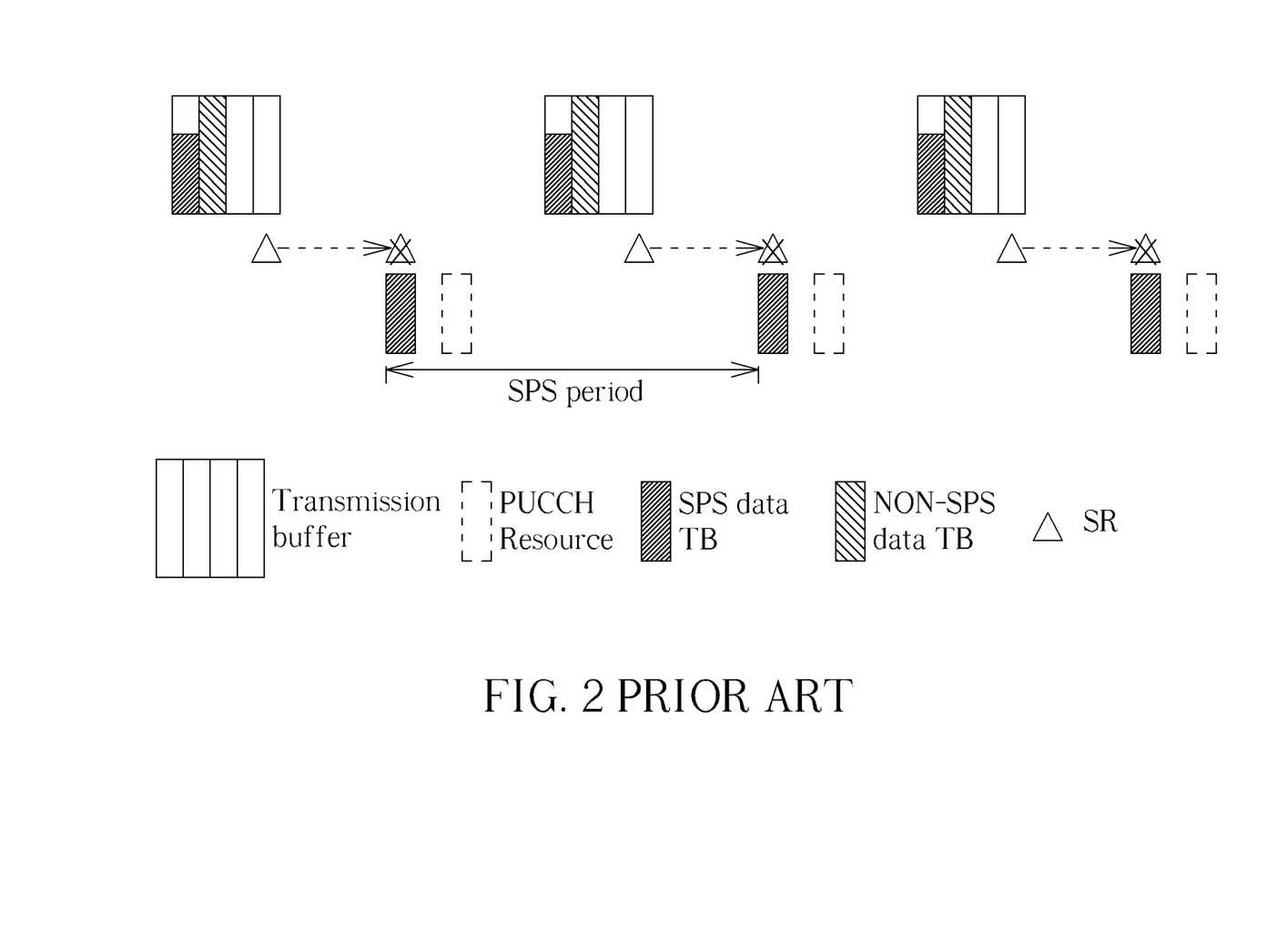
FIG. 2 is a timing diagram illustrating that SPS resources periodically cancel SRs according to the prior art.
Figure 7:
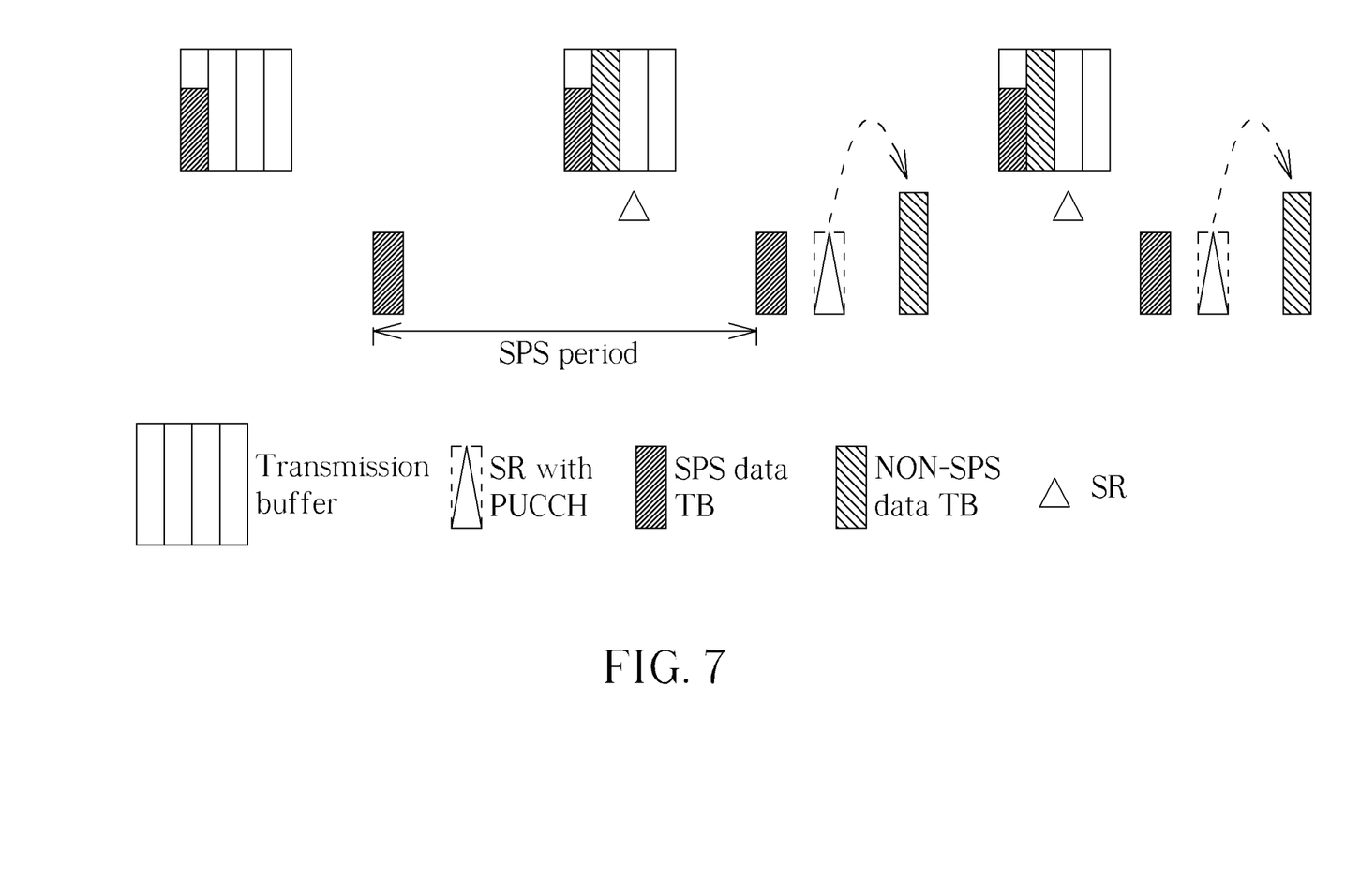
FIG. 7 is a timing diagram illustrating SR behavior when there are SPS data and non-SPS data in the transmission buffer according to the process in FIG. 6.

In the prior art, as shown in FIG. 2, the periodical SR cancellation results in non-SPS data always set in the transmission buffer. Please refer to FIG. 7, which is a timing diagram illustrating SR behavior when there are SPS data and non-SPS data in the transmission buffer according to the process 30. As shown in FIG. 7, when SPS resources are configured, the pending SR triggered by non-SPS data is not cancelled by periodic SPS resources and is transmitted with the coming PUCCH, so that the eNB is informed about the non-SPS data set in the transmission buffer and allocates an UL resource for the non-SPS data through dynamic scheduling. The worst case resulting from the embodiment of the present invention is just a wasted PDCCH assignment. In comparison, the embodiment of the present invention enhances opportunities of non-SPS data transmission when SPS resources are configured.

Figure 8:
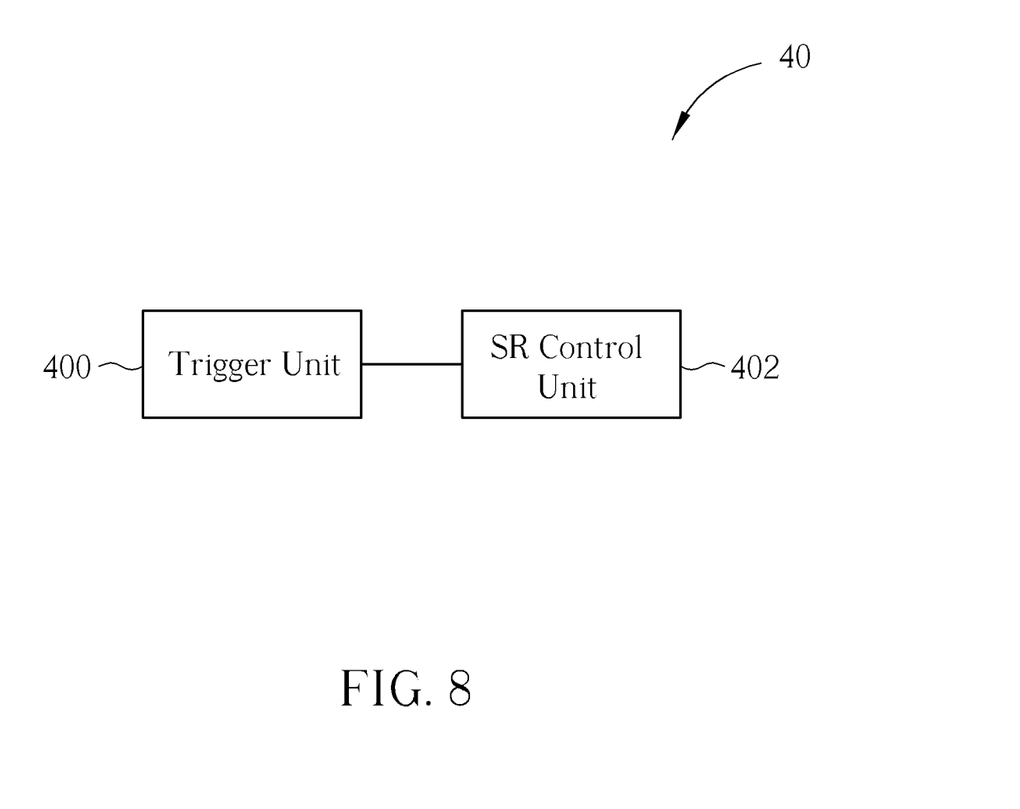
FIG. 8 is a schematic diagram of a communication device according to the process in FIG. 6.

Please refer to FIG. 8, which is a schematic diagram of a communication device 40 according to an embodiment of the present invention. The communication device 40 is a hardware implementation of the process 30 in FIG. 6. The communication device 40 comprises a trigger unit 400 and an SR control unit 402, where the trigger unit 400 is utilized for triggering an SR when the communication device 40 does not have any uplink resource allocated for a current transmission time interval, which is the step 302 of the process 30, and the SR control unit 402 is coupled to the trigger unit 400, for controlling the triggered SR to remain pending and to be repeated until uplink resources are granted for a new transmission when semi-persistent scheduling is configured, which is the step 304 of the process 30. Types of the UL resources for the new transmission are mentioned as above, and are not repeated. Through the communication device 40, when SPS is configured, the pending SR is cancelled by the UL resources granted by the dynamic scheduling C-RNTI, and when there is no problem of the periodic SR cancellation, the pending SR can also be cancelled by the UL resources granted by SPS C-RNTI and by the periodic SPS resources.

Figure 9:
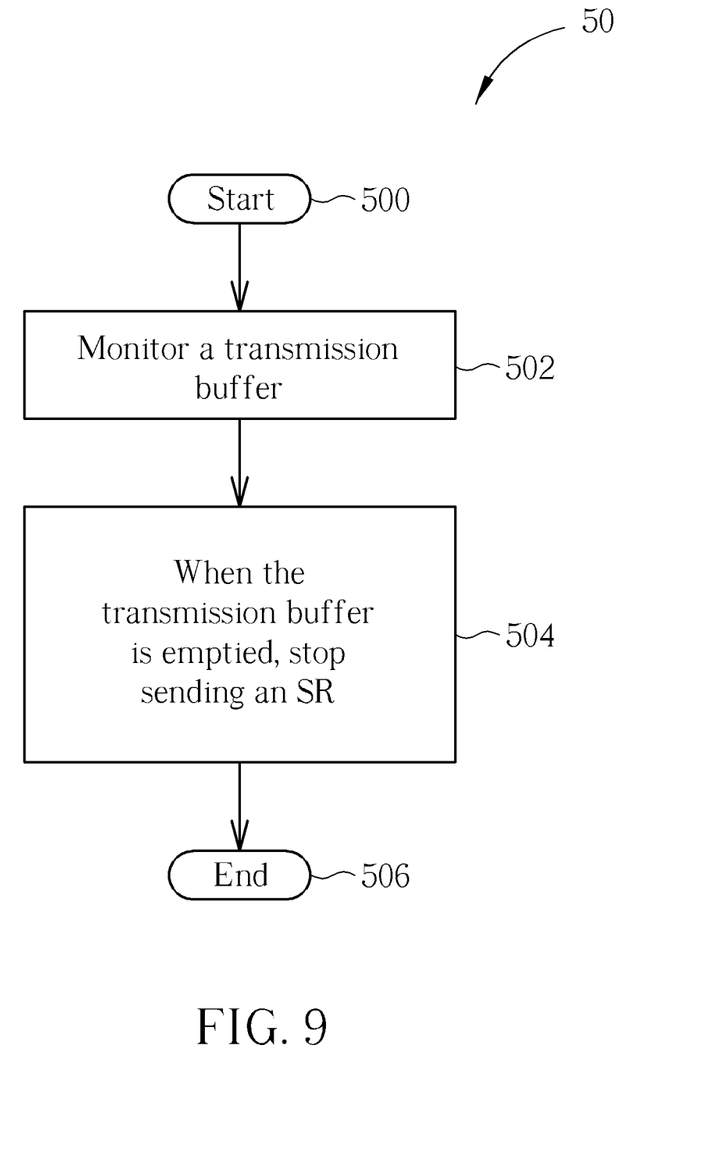
FIG. 9 is a flowchart of a process according to an embodiment of the present invention.

As mentioned previously, the eNB has the right to ignore SRs from any UE if the eNB considers it proper. Though the eNB can control subsequent operations after receiving the SR, it is still beneficial for the UE to use PUCCH resources for SR prudently. Please refer to FIG. 9, which is a flowchart of a process 50 according to an embodiment of the present invention. The process 50 is utilized in a UE for SR behavior. The process 50 can be compiled into the program code 214 and includes the following steps:

Step 500: Start.
Step 502: Monitor a transmission buffer.
Step 504: When the transmission buffer is emptied, stop sending an SR.
Step 506: End.

In the process 50, the UE, more specifically, the MAC layer of the UE, monitors the transmission buffer so that the UE knows that the transmission buffer is occupied by data or is emptied, and when the transmission buffer is emptied, the UE, more specifically, the PHY layer of the UE is informed by the MAC layer of the UE to stop sending the SR because the data in the transmission buffer has been completely transmitted, the request for UL-SCH resources is unnecessary and results in a wasted physical uplink control channel (PUCCH) for sending the SR. Note that, Step 504 is performed in two different ways according to whether a PUCCH is configured with the UE. When a PUCCH is configured with the UE, the PHY layer of the UE deactivates the pending SR, so that the pending SR is not transmitted on the PUCCH. When no PUCCH is configured with the UE, the PHY layer of the UE stops transmitting a Random Access Preamble, so that the UE does not waste Physical Random Access Channel (PRACH) resource.

In the above-mentioned embodiment of the present invention, the MAC instructs the PHY in the UE to stop sending SRs, which depends on whether a PUCCH is configured with the UE. Therefore, the resource for sending SR, i.e. PUCCH or PRACH, is not wasted. In the prior art, the UE does not perform any process responding to the situation that the transmission buffer is emptied such that a pending SR continues. However, there is no meaning for a UE continuing SR after the transmission buffer is emptied. Compared with the prior art, according to the process 50, the UE stops sending an SR when the transmission buffer is emptied, and therefore a PUCCH or PRACH is not wasted, and the unnecessary UL-SCH resource responding to the pending SR is not allocated.

Figure 10:
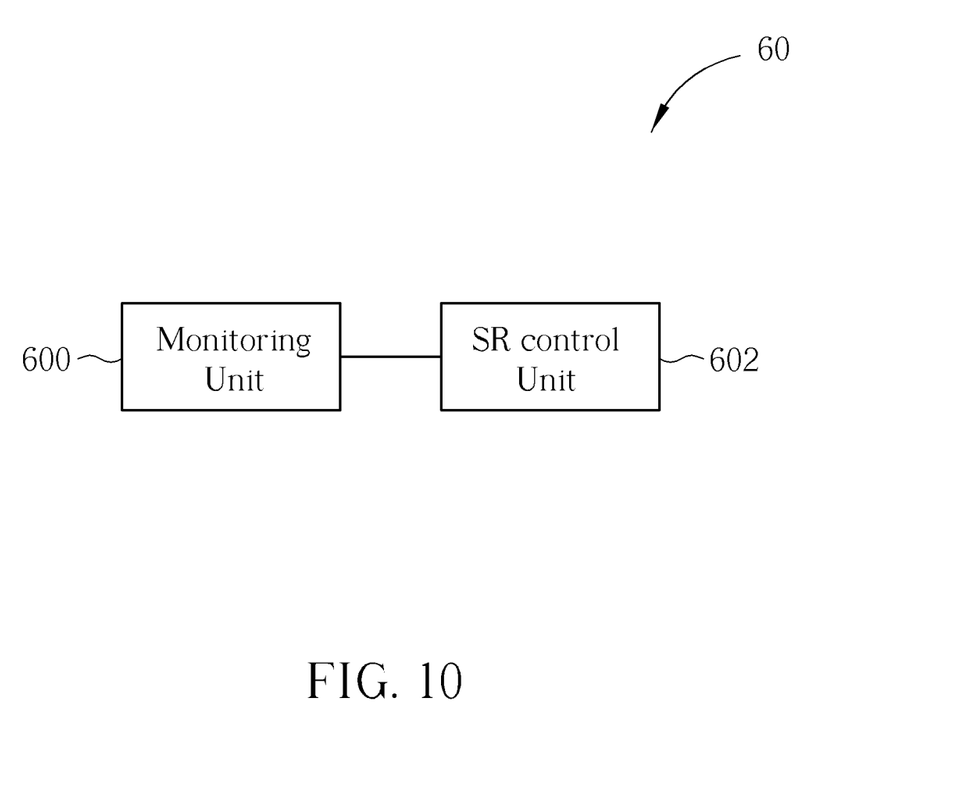
FIG. 10 is a schematic diagram of a communication device according to the process in FIG. 9.

Please refer to FIG. 10, which is a schematic diagram of a communication device 60 according to an embodiment of the present invention. The communication device 60 is a hardware implementation of the process 50 in FIG. 9, which comprises a monitoring unit 600 and an SR control unit 602.

The monitoring unit 600 is utilized for monitoring a transmission buffer. The SR control unit 602 is coupled to the monitoring unit 600, and is utilized for controlling the communication device 60 to stop sending an SR when the monitoring unit 600 observes that the transmission buffer is emptied. Operations of the monitoring unit 600 and the SR control unit 602 are the step 502 and the step 504 of the process 50, which are not repeated herein.

In conclusion, the embodiments of the present invention set criteria of SR cancellation more precisely, so that the SR triggered by non-SPS data is not cancelled by SPS activation/modification or periodic SPS resources, and therefore the non-SPS data is transmitted successfully when SPS resources are configured. In addition, the embodiments of the present invention stop sending SR when the transmission buffer is emptied, so that the UL resource for SR is not wasted. Through the improvement of SR behavior according to the present invention, non-SPS data transmission and the use of UL resources become more efficient.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of scheduling request, abbreviated to SR, behavior of a user equipment, abbreviated to UE, in a wireless communication system, the method comprising:
    triggering an SR, by the UE, for transmitting non-semi-persistent scheduling (non-SPS) data, when the UE does not have any uplink resource for transmitting the non-SPS data for a current transmission time interval, wherein the non-SPS data are those data other than SPS data generated periodically from a Voice over Internet Protocol (VoIP) service; and
    when semi-persistent scheduling is configured to the UE for transmitting SPS data, controlling the triggered SR to remain pending and to be repeatedly transmitted with a coming physical uplink control channel (PUCCH) to avoid the triggered SR from being cancelled by SPS resources for transmitting the SPS data, until the uplink resources are granted for a new transmission of the non-SPS data.

2. The method of claim 1, wherein the uplink resources for the new transmission are granted by a dynamic scheduling cell radio network temporary identifier.

3. The method of claim 1, wherein the uplink resources for the new transmission are granted by a semi-persistent scheduling cell radio network temporary identifier.

4. The method of claim 1, wherein the uplink resources for the new transmission are configured by a radio resource control layer of the UE due to semi-persistent scheduling.

5. A communication device of a wireless communication system for scheduling request, abbreviated to SR, behavior, the communication device comprising:
    a computer readable recording medium for storing program code corresponding to a process;
    a processor coupled to the computer readable recording medium for processing the program code to execute the process, wherein the process comprises:
    triggering an SR for transmitting non-semi-persistent scheduling (non-SPS) data, when the communication device does not have any uplink resource for transmitting the non-SPS data for a current transmission time interval, wherein the non-SPS data are those data other than SPS data generated periodically from a Voice over Internet Protocol (VoIP) service; and
    when semi-persistent scheduling is configured to the communication device for transmitting SPS data, controlling the triggered SR to remain pending and to be repeatedly transmitted with a coming physical uplink control channel (PUCCH) to avoid the triggered SR from being cancelled by SPS resources for transmitting the SPS data, until the uplink resources are granted for a new transmission of the non-SPS data.

6. The communication device of claim 5, wherein the uplink resources for the new transmission are granted by a dynamic scheduling cell radio network temporary identifier or a semi-persistent scheduling cell radio network temporary identifier.

7. The communication device of claim 5, wherein the uplink resources for the new transmission are configured by a radio resource control layer of the communication device due to semi-persistent scheduling.

8. A communication device of a wireless communication system for scheduling request, abbreviated to SR, behavior, the communication device comprising:
    a trigger unit for triggering an SR for transmitting non-semi-persistent scheduling fnon-SPS) data, when the communication device does not have any uplink resource for transmitting the non-SPS data for a current transmission time interval, wherein the non-SPS data are those data other than SPS data generated periodically from a Voice over Internet Protocol (VoIP) service; and
    an SR control unit coupled to the trigger unit, for when semi-persistent scheduling is configured to the communication device for transmitting SPS data, controlling the triggered SR to remain pending and to be repeatedly transmitted with a coming physical uplink control channel fPUCCH) to avoid the triggered SR from being cancelled by SPS resources for transmitting the SPS data, until the uplink resources are granted for a new transmission of the non-SPS data when semi-persistent scheduling is configured.

9. The communication device of claim 8, wherein the uplink resources for the new transmission are granted by a dynamic scheduling cell radio network temporary identifier.

10. The communication device of claim 8, wherein the uplink resources for the new transmission are granted by a semi-persistent scheduling cell radio network temporary identifier.

11. The communication device of claim 8, wherein the uplink resources for the new transmission are configured by a radio resource control layer of the communication device due to semi-persistent scheduling.

12. The method of claim 1, further comprising:
    stopping sending the SR when the transmission buffer is emptied, after the non-SPS data are all transmitted by using unused SPS resources.

13. The method of claim 12, wherein the step of stopping sending the SR when the transmission buffer is emptied comprises:
    when a physical uplink control channel is configured with the UE, deactivating a pending SR.

14. The method of claim 12, wherein the step of stopping sending the SR when the transmission buffer is emptied comprises:
    when no physical uplink control channel is configured with the UE, stopping transmitting a Random Access Preamble.

15. The communication device of claim 5, wherein the process further comprises:

stopping sending the SR when the transmission buffer is emptied, after the non-SPS data are all transmitted by using unused SPS resources.

16. The communication device of claim 15, wherein the step of stopping sending the SR when the transmission buffer is emptied comprises:

when a physical uplink control channel is configured with the communication device, deactivating a pending SR.

17. The communication device of claim 15, wherein the step of stopping sending the SR when the transmission buffer is emptied comprises:

when no physical uplink control channel is configured with the communication device, stopping transmitting a Random Access Preamble.

18. The communication device of claim 5, wherein the SR control unit stops sending the SR when the monitoring unit observes that the transmission buffer is emptied, after the non-SPS data are all transmitted by using unused SPS resources.

19. The communication device of claim 18, wherein the SR control unit deactivates a pending SR when a physical uplink control channel is configured with the communication device.

20. The communication device of claim 18, wherein the SR control unit stops transmitting a Random Access Preamble when no physical uplink control channel is configured with the communication device.

* * * * *